United States Patent [19]

Kanda et al.

[11] Patent Number: 5,088,700
[45] Date of Patent: Feb. 18, 1992

[54] FLUID-FILLED ELASTIC MOUNT HAVING ELASTIC BODY PRE-COMPRESSED BY STOPPER MEMBER

[75] Inventors: Ryouji Kanda, Komaki; Kiyohiko Yosida, Kasugai, both of Japan

[73] Assignee: Tokai Rubber Industries, Ltd., Komaki, Japan

[21] Appl. No.: 652,248

[22] Filed: Feb. 6, 1991

Related U.S. Application Data

[63] Continuation of Ser. No. 301,875, Jan. 26, 1989, abandoned.

[30] Foreign Application Priority Data

Jan. 30, 1988 [JP] Japan .................. 63-11631

[51] Int. Cl.⁵ ............................. F16F 13/00
[52] U.S. Cl. .............. 267/140.1 A; 180/312; 248/562; 248/636; 267/219
[58] Field of Search ........... 267/140.1 R, 140.1 A, 267/153, 219; 180/300, 312, 902; 248/562, 636

[56] References Cited

U.S. PATENT DOCUMENTS

| | | | |
|---|---|---|---|
| 2,744,718 | 5/1956 | Markowski et al. | 267/140.1 |
| 2,917,265 | 12/1959 | Markowski | 267/140.1 |
| 3,537,696 | 11/1970 | Webster, Jr. | 267/293 |
| 4,650,168 | 3/1987 | Andra et al. | 267/140.1 |
| 4,679,778 | 7/1987 | Tabata et al. | 248/562 X |
| 4,682,753 | 7/1987 | Clark | 267/140.1 X |
| 4,834,350 | 5/1989 | de Fontenay | 267/140.1 A |
| 4,836,515 | 6/1989 | Franz et al. | 267/140.1 A |
| 4,915,365 | 4/1990 | Lee | 248/562 X |
| 4,974,819 | 12/1990 | Reichard et al. | 248/562 X |

FOREIGN PATENT DOCUMENTS

| | | | |
|---|---|---|---|
| 183267 | 6/1986 | European Pat. Off. | 248/562 |
| 37337 | 3/1983 | Japan | 267/140.1 |
| 274132 | 12/1986 | Japan | 267/140.1 |
| 147139 | 7/1987 | Japan | 267/140.1 |

*Primary Examiner*—George E. A. Halvosa
*Attorney, Agent, or Firm*—Oliff & Berridge

[57] ABSTRACT

A fluid-filled elastic mount for flexible connection of two members, including a first and a second support member, an elastic body interposed between the first and second support members, a closure member for partially defining a fluid chamber filled with a non-compressible fluid, a partition assembly for dividing the fluid chamber into a pressure-receiving chamber and an equilibrium chamber, and device for defining a restricted passage for restricted fluid communication between the pressure-receiving and equilibrium chambers. One of the first and second support members has a first abutting surface which extends substantially perpendicularly to the load-receiving direction, and a second abutting surface substantially perpendicular to the first abutting surface. The elastic mount is provided with a stopper member secured to the other of the first and second support members. The stopper member includes a stop portion which is spaced apart from the second abutting surface in a direction perpendicular to the load-receiving direction. The stop portion is held in pressed abutting contact with the first abutting surface in the load-receiving direction, whereby the elastic body is pre-compressed in the load-receiving direction.

13 Claims, 4 Drawing Sheets

FLUID-FILLED ELASTIC MOUNT HAVING ELASTIC BODY PRE-COMPRESSED BY STOPPER MEMBER

This is a continuation of application Ser. No. 07/301,875 filed Jan. 26, 1989, now abandoned.

BACKGROUND OF THE INVENTION

1. Field of the Invention

The present invention relates generally to a fluid-filled elastic mounting structure, and more particularly to improvements in such a fluid-filled elastic mounting structure, in the durability and vibration damping and isolating characteristics.

2. Discussion of the Prior Art

Recently, a so-called fluid-filled elastic mount has been increasingly used as an elastic mounting device for flexible connection of a given member to a support structure, for example, an engine mount for flexible mounting of a power unit of a motor vehicle to the body of the vehicle. Such a fluid-filled elastic mount is adapted to damp and isolate input vibrations, based on restricted flow of a non-compressible fluid through a restricted passage, between two fluid chambers defined within the structure of the elastic mount.

Described more specifically, a generally used fluid-filled elastic mount of the type indicated above includes an elastic body made of a rubber material, which elastically connects a first and a second support member which are disposed opposite to each other in a mutually spaced-apart relation in a load-receiving direction in which a major vibrational load is received. A fluid chamber is defined between the elastic body, and a closure member which includes a flexible portion and which is secured to the second support member. The fluid chamber is filled with a non-compressible fluid. The fluid chamber is divided by a suitable partition assembly, into a pressure-receiving chamber formed on the side of the first support member, and an equilibrium chamber formed on the side of the closure member. The elastic mount has suitable means for defining a restricted fluid passage for restricted fluid flow between the pressure-receiving and equilibrium chambers.

Upon application of a vibrational load to the elastic mount, the volume of the pressure-receiving chamber is changed due to elastic deformation of the elastic body, and the fluid pressure in the pressure-receiving chamber is accordingly varied. As a result, the non-compressible fluid is forced to flow through the restricted fluid passage, between the pressure-receiving and equilibrium chamber, due to the change in the pressure in the pressure-receiving chamber, relative to that in the equilibrium chamber. Since the volume of the equilibrium chamber is variable due to a displacement of the flexible portion of the closure member, the pressure in the equilibrium chamber is maintained substantially constant when the fluid flows into and from the equilibrium chamber. In this arrangement, the input vibrational load having a frequency over a range to which the restricted fluid passage is tuned can be suitably isolated, based on the fluid flows through the restricted passage, or on resonance of the fluid mass in the mounting structure.

When the fluid-filled elastic mount is installed in position, the weight of a given member which is flexibly mounted on a support structure through the elastic mount acts on the mount in the load-receiving direction. Where the elastic mount serves as an engine mount for an automotive vehicle, a considerably large weight of the power unit including an engine is applied to the engine mount. Therefore, the pressure in the pressure-receiving chamber is considerably increased, and the volume of the equilibrium chamber is accordingly increased with an excessive degree of displacement of the flexible portion or flexible diaphragm of the closure member. This phenomenon deteriorates the durability of the flexible diaphragm, and consequently causes a relatively low level of durability of the fluid-filled engine mount per se.

Further, the expansion of the equilibrium chamber due to the static load acting on the elastic mount as described above inevitably requires the elastic mount to be large-sized, in order that the amount of volumetric change that may take place in the thus expanded equilibrium chamber upon application of a vibrational load to the elastic mount is sufficient to absorb or accommodate an increase in the pressure in the pressure-receiving chamber which is caused by the received vibrational load. If the amount of volumetric change of the equilibrium chamber indicated above is insufficient, the fluid may be inhibited from flowing from the pressure-receiving chamber into the equilibrium chamber, when the magnitude of the input vibration is extremely large. In this case, the elastic mount will not provide a desired vibration isolating effect.

SUMMARY OF THE INVENTION

It is therefore an object of the present invention to provide a fluid-filled elastic mount which has improved durability and vibration damping and isolating characteristics.

The above object may be achieved according to the present invention, which provides a fluid-filled elastic mount for flexible connection of two members, comprising: (a) first support means and second support means which are disposed opposite to each other and spaced apart from each other in a load-receiving direction in which a major vibrational load is applied to the elastic mount, one of the first and second support means having a first abutting surface which extends substantially perpendicularly to the load-receiving direction, and a second abutting surface which is substantially perpendicular to the first abutting surface; (b) an elastic body interposed between the first and second support means, for elastic connection of the first and second support means; (c) a closure member secured to the second support means and cooperating with at least the elastic body to define a fluid chamber filled with a non-compressible fluid, the closure member including a flexible portion; (d) partition means for dividing the fluid chamber into a pressure-receiving chamber formed on the side of the first support means, and an equilibrium chamber formed on the side of the second support means; (e) means for defining a restricted passage for restricted fluid communication between the pressure-receiving and equilibrium chambers; and (f) a stopper member secured to the other of the first and second support means, and including a stop portion which is spaced apart a predetermined distance from the second abutting surface in a direction perpendicular to the load-receiving direction. The stop portion is held in pressed abutting contact with the first abutting surface in the load-receiving direction so that the first and second support means approach each other, whereby the elastic body is pre-compressed in the load-receiving direction.

In the fluid-filled elastic mount of the present invention constructed as described above wherein the stop portion of the stopper member secured to one of the first and second support means is held in pressed contact with the first abutting surface of the other support means, so as to exert a compressing force in the direction that causes the two support means to approach each other, i.e., in the load-receiving direction in which the weight of the member to be mounted by the instant elastic mount acts on the elastic mount. Thus, the elastic body of the elastic mount as manufactured is pre-compressed in the load-receiving direction, whereby the amount of elastic deformation of the elastic mount due to the static load (i.e., weight of the member to be mounted) upon installation of the elastic mount is effectively minimized.

Accordingly, the stopper member effectively reduces the amount of volumetric increase of the equilibrium chamber, i.e., the amount of deformation or displacement of the flexible portion of the closure member, upon installation of the instant elastic mount. In other words, the durability of the closure member is significantly improved.

Further, the reduction in the volumetric increase of the equilibrium chamber upon installation of the elastic mount permits a sufficient amount of the volumetric change of the equilibrium chamber and a sufficient amount of the fluid flows during operation of the elastic mount, thereby enabling the elastic mount to exhibit desired vibration isolating characteristics and improved operating stability, without having to enlarge the overall structure of the elastic mount.

In one form of the present invention, the stopper member has a circular cross sectional shape as viewed in a plane perpendicular to the load-receiving direction, and includes a first axial end portion extending radially inwardly so as to provide the stop portion, and a second end portion at which the stopper member is secured to the other of the first and second support means. The second end portion of the stopper member may be secured to the other of the first and second support means by calking one of the second end portion and an end portion of the other support means. In this case, the elastic body is pre-compressed by the stopper member when the second end portion of the stopper member and the above-indicated other support means are calked together.

The stopper member may be secured to the second support means to which the closure member is secured.

In another form of the invention, the second support means includes a dished member, and a generally cylindrical member secured at one end thereof to the dished member, and the stopper member is secured to the other end of the generally cylindrical member. In this case, the elastic body is generally secured by vulcanization to the first support means and the generally cylindrical member of the second support means.

In a further form of the invention, the stop portion of the stopper member is embedded in a stop rubber member, so that the stop portion is held in pressed contact with the first abutting surface via the stop rubber member, and is abuttable against the second abutting surface via the stop rubber member.

The partition means may include the means for defining a restricted passage for restricted fluid communication between the pressure-receiving and equilibrium chamber. In this case, the partition means may use a first and a second partition member which cooperate with each other to provide the means for defining the restricted passage. The first and second partition members may be adapted to define therebetween a space in which is received a movable member, so that the movable member is displaceable in the space in the load-receiving direction. In this instance, the partition members have respective holes through which the space communicates with the pressure-receiving and equilibrium chambers. The partition means may further use a third partition member which cooperates with the second partition member to define a second space therebetween, and a second movable member received in the second space. The second space communicates with the equilibrium chamber and the first space defined between the first and second partition members. The second movable member is displaceable within the second space in the load-receiving direction.

BRIEF DESCRIPTION OF THE DRAWINGS

The above and other objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

Figure 1:
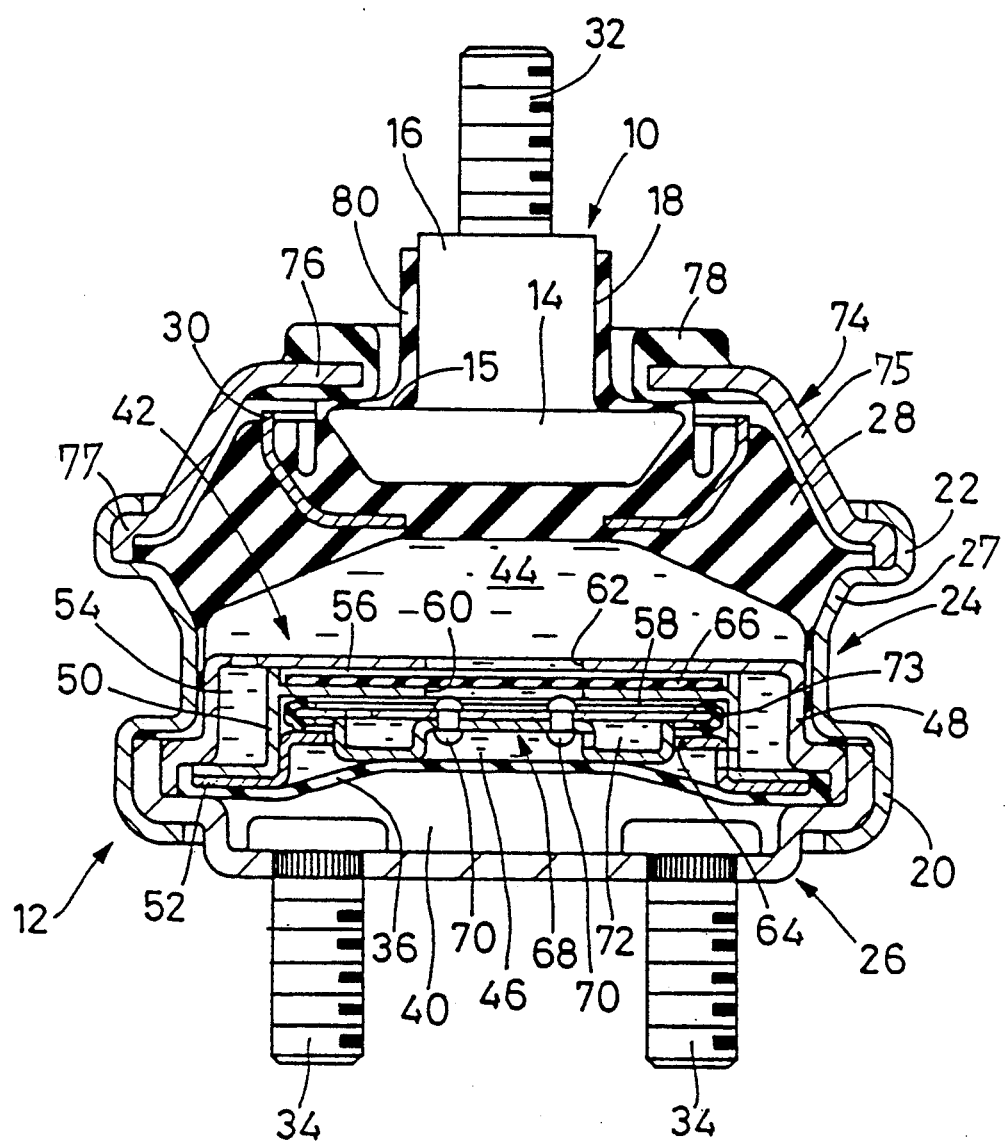
FIG. 1 is an elevational view in axial cross section of one embodiment of a fluid-filled elastic mount of the present invention in the form of an engine mount.

Referring first to FIG. 1, reference numerals 10 and 12 respectively denote first and second support means in the form of a first and a second metal support of an engine mount designed for use on an automotive vehicle. The first and second metal supports 10, 12 are disposed opposite to each other with a predetermined spacing therebetween, in a load-receiving direction in which a major input vibrational load is applied to the engine mount.

The first metal support 10 includes a base portion 14 which has an inverted truncated conical cross sectional shape, and a cylindrical portion 16 which axially extends from a central part of a larger end face 15 of the base portion 14. The cylindrical portion 16 has a circumferential surface 18. On the other hand, the second metal support 12 includes a generally cylindrical member 24 having axially opposite calked end portions 20, 22, and a dished member 26 which is secured to the calked end portion 20 of the generally cylindrical member 24, such that the dished member 26 closes the adjacent open end 20 of the generally cylindrical member 24. Thus, the second metal support 12 is generally cup-shaped, having a circular cross sectional shape in a plane perpendicular to the load-receiving direction. The first and second metal supports 10, 12 are disposed concentrically or coaxially with each other, with a suitable distance between the small end face of the base portion 14 of the first metal support 10 and the inner surface of the dished member 26 of the second metal support 12.

Figure 2:
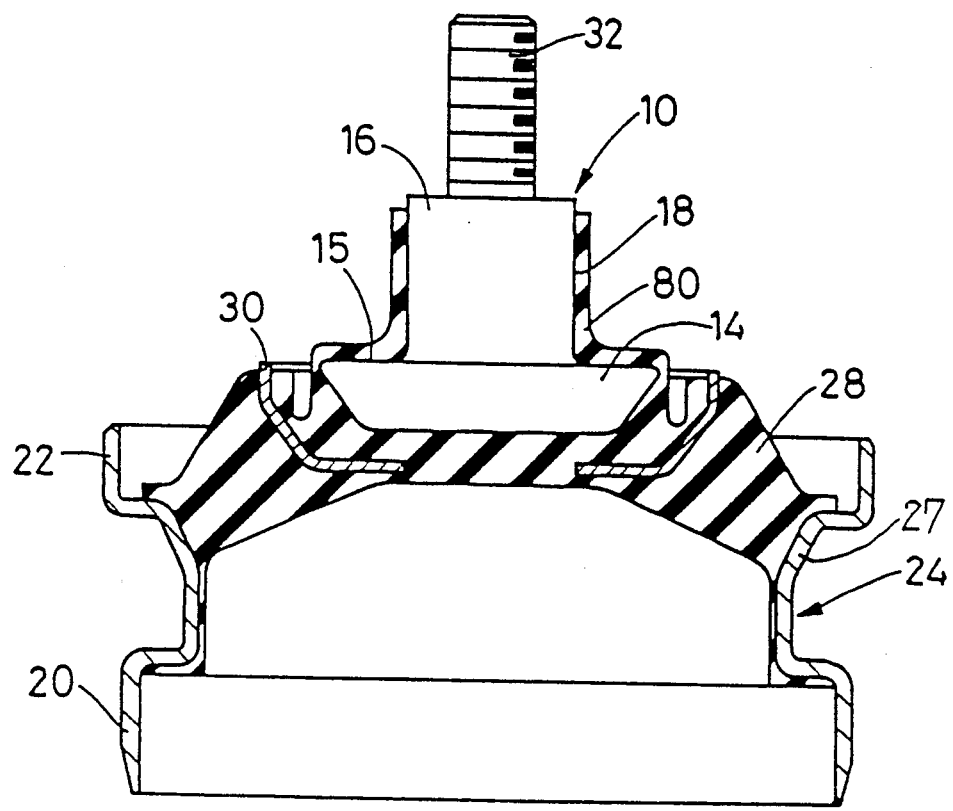
FIG. 2 is an elevational view in axial cross section of an intermediate product prepared during manufacture of the,. engine mount of FIG. 1.

As also shown in FIG. 2, the generally cylindrical member 24 has a tapered portion 27 adjacent to the end portion 22 on the side of the first metal support 10. The tapered portion 27 is tapered such that the diameter increases in the direction from the end portion 20 toward the end portion 22. The tapered portion 27 has substantially the same angle of taper as that of the truncated conical base portion 14 of the first metal support 10.

The first and second metal supports 10, 12 constructed as described above are elastically connected to each other by a generally truncated conical rubber block 28 secured thereto by vulcanization of a rubber material. More particularly, the rubber block 28 is secured to the base portion 14 of the first metal support 10, and to the tapered portion 27 which cooperates with the end portion 22 to define an open end of the second metal support 12. The rubber block 28 has a metallic annular restrictor member 30 embedded therein. The restrictor member 30 is shaped so as to surround the base portion 14 of the first metal support 10. The restrictor member 30 is provided to adjust the elastic properties of the rubber block 28, in its axial and radial directions.

The first metal support 10 is formed with an upper mounting bolt 32 extending from the upper end face of the cylindrical portion 16, while the second metal support 12 is provided with lower mounting bolts 34 fastened to the bottom wall of the dished member 26. The instant engine mount is installed for connecting an engine unit of the vehicle to the body of the vehicle, in a vibration damping and isolating manner, such that the first metal support 10 is attached at its upper mounting bolt 32 to the engine unit, while the second metal support 12 is attached at its lower mounting bolts 34 to the vehicle body. The engine mount is positioned with the first and second metal supports 10, 12 opposed to each other in the load-receiving direction, i.e., in the vertical direction.

Within the second metal support 12, there is disposed closure means in the form of a thin flexible diaphragm 36 made of an elastic material. The diaphragm 36 is secured at its periphery to the second metal support 12 such that the peripheral portion of the diaphragm 36 is held in pressed fluid-tight contact with the peripheral portion of the dished member 26, which is held by the calked end portion 20 of the generally cylindrical member 24. The diaphragm 36 divides an interior space 50 defined by the rubber block 28 and the second metal support 12, into two parts.

The division of the interior space of the engine mount on one side of the diaphragm 36 on the side of the rubber block 28 serves as a fluid-filled space filled with a non-compressible fluid such as water, polyalkylene glycol or silicone oil. The other division formed on the other side of the diaphragm 36, i.e., on the side of the second metal support 12, serves as an air chamber 40 which allows the diaphragm 36 to be displaced outwardly toward the dished member 26. FIG. 2 shows an intermediate product wherein the rubber block 28 is secured by vulcanization to the first metal support 10 and the generally cylindrical member 24 of the second metal support 12. The filling of the fluid-filled space indicated above is effected in a suitable manner, for instance, while the dished member 26 of the second metal support 12 is fixed to the intermediate product (by calking the end portion 20 of the generally cylindrical portion 24), within a mass of the non-compressible fluid.

Within the fluid-filled space, there is fixedly disposed a generally disk-shaped partition assembly generally indicated at 42 in FIG. 1. This partition assembly 42 and the flexible diaphragm 36 are fluid-tightly gripped at their peripheral portions by and between the calked end portion 20 of the generally cylindrical member 24 and dished member 26 of the second metal support 12. The partition assembly 42 divides the fluid-filled space into a pressure-receiving chamber 44 formed on the side of the rubber block 28, and an equilibrium chamber 46 formed on the side of the diaphragm 36. Upon application of a vibrational load to the engine mount, the fluid pressure in the pressure-receiving chamber 44 is changed due to elastic deformation of the rubber block 28, while a change in the fluid pressure in the equilibrium chamber 46 is prevented by elastic deformation or displacement of the flexible diaphragm 36.

The partition assembly 42 fixedly disposed in the fluid-filled space includes a first, a second and a third annular partition member 48, 50, 52 which are made of a metallic material and which are superposed on each other in a mutually coaxial or concentric relation.

The peripheral portions of the first and second partition members 48, 50 cooperate with each other to define a circumferential first orifice passage 54 for restricted fluid communication between the pressure-receiving and equilibrium chambers 44, 46.

Further, the first and second partition members 48, 50 have central portions which define a first thin flat circular space 56 formed in a plane perpendicular to the load-receiving direction. Similarly, the second and third partition members 50, 52 have central portions which define a second thin flat circular space 58 formed parallel to the first space 56. The second space 58 is concentric with the first space 56, and communicates with the first space 56 through a central hole 60 formed through the second partition member 50. The first space 56 communicates with the pressure-receiving chamber 44 through a central hole 62 formed through the first partition member 48, while the second space 58 also communicates with the equilibrium chamber 46 through a central hole 64 formed through the third partition member 52.

A first and a second movable member 66, 68 are disposed within the first and second spaces 56, 58, respectively, such that the movable members 66, 68 are movable over predetermined distances in the load-receiving direction. The first movable member 66 consists of a thin disk-like rubber member, while the second movable member 68 consists of two hard plates superposed on each other and fixed together with fasteners 70. The two hard plates of the second movable member 68 define a second orifice passage 72 formed in their outer portions so as to extend in the circumferential direction. The first space 56 and the equilibrium chamber 46 are held in communication with each other through the second orifice passage 72. Reference numeral 73 designates an annular elastic retainer which elastically holds the second movable member 68 within the second space 58, so as to allow a suitable amount of displacement of the member 68 in the load-receiving direction.

When a large-amplitude, low-frequency vibrational load is applied to the instant elastic engine mount, the non-compressible fluid is forced to flow through the first orifice or restricted passage 54 due to a pressure difference between the pressure-receiving and equilibrium chambers 44, 46, while the first movable member 66 is not responsive to such vibrations. When a small-amplitude, high-frequency vibrational load is applied to the engine mount, the first movable member 66 is displaced and the fluid flows through the second orifice passage 72, while the first orifice passage 54 is placed in a condition as if the passage 54 were closed. When the input vibrations have a higher frequency, the fluid does not flow through the first and second orifice passages 54, 72, and the first and second movable members 66, 68 are displaced in response to the input vibrations.

Thus, the vibrations having relatively low frequency ranges to which the first and second orifice passages 54, 72 are tuned can be effectively isolated, based on the fluid flows through the orifices 54, 72, or on resonance of the fluid masses in the engine mount. When the instant engine mount is subject to the vibrations having relatively high frequencies, the displacements of the first and second movable members 66, 68 avoid an excessive rise in the fluid pressure within the pressure-receiving chamber 44, and prevent the engine mount from exhibiting an excessively high spring constant.

Figure 3:
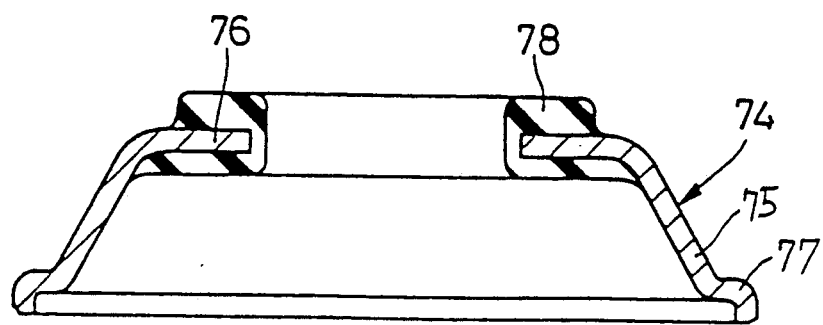
FIG. 3 is an elevational cross sectional view of a stopper member of the engine mount.

The instant engine mount having the thus constructed partition assembly 42 within the fluid-filled space is provided with a stopper member 74, which is disposed so as to connect the second metal support 12 to a portion of the rubber block 28 adjacent to the first metal support 10, while covering the outer circumferential surface of the rubber block 28. Described in greater detail referring also to FIG. 3, the stopper member 74 has a tapered portion 75 substantially following the outer tapered surface of the truncated conical rubber block 28, a first end portion 76 extending from the small-diameter end of the tapered portion 75 in a direction parallel to the end face 15 of the base portion 14 of the first metal support 10, and a second end portion 77 at the large-diameter end of the tapered portion 75. The stopper member 74 is secured at its second end portion 77 to the calked end portion 22 of the generally cylindrical member 24 of the second metal support 12. The end portion 22 of the generally cylindrical portion 24 is either roll-calked or press-calked against the second end portion 77 of the stopper member 74,.

The first end portion 76 of the stopper member 74, which serves as a stop portion, is positioned such that its extreme end is spaced a suitable distance from the circumferential surface 18 of the first metal support 10 in the radial direction of the cylindrical portion 16, while its inner flat surface is spaced a suitable distance away from the end surface 15 of the base portion 14 in the axial direction of the cylindrical portion 16. The first end portion or stop portion 76 is surrounded by or embedded in a stop rubber member 78, while the circumferential surface 18 and the end face 15 of the first metal support 10 are covered by a rubber layer 80.

When the end portion 22 of the generally cylindrical member 24 of the intermediate product of FIG. 2 is calked against the second end portion 77 of the stopper member 74, the stopper member 74 is displaced a certain distance in the load-receiving direction, toward the rubber block 28, whereby the first end portion or stop portion 76 of the stopper member 74 is pressed against the end face 15 of the base portion 14 of the first metal support 10, via the stop rubber member 78 and the rubber layer 80. As a result, the first metal support 10 is displaced a given distance toward the second metal support 12, with the rubber block 28 pre-compressed by the corresponding amount in the load-receiving direction.

It follows from the above description that the end face 15 of the base portion 14 of the first metal support 10 serves as a first abutting surface which extends perpendicularly to the load-receiving direction, while the circumferential surface 18 of the cylindrical portion 16 serves as a second abutting surface extending parallel to the load-receiving direction. The stop portion 76 of the stopper member 74 is held in pressed contact with the first abutting surface 15 via the stop rubber member 78 and the rubber layer 80, and is abuttable with the second abutting surface 18 via the rubber member and layer 78, 80.

In the present embodiment, the stopper member 74 is secured by calking to the generally cylindrical member 24 of the second metal support 12, before the dished member 26 is secured by calking to the intermediate product of FIG. 2, i.e., before the space 44, 46 is filled with the non-compressible fluid.

Namely, the rubber block 28 is pre-compressed by a displacement of the first metal support 10 toward the second metal support 12 upon fixing of the stopper member 76 to the second metal support 12. This pre-compression of the rubber block 28 does not cause an increase in the fluid pressure in the engine mount, which would occur if the stopper member 74 were fixed to the second metal support 12 after the engine mount is filled with the non-compressible fluid. Since the precompression does not result in an increase of the fluid pressure in the engine mount, flexible diaphragm 36 is not deflected by the pre-compression of rubber block 28. In this manner, a suitable amount of initial load is applied to the rubber block 28, in the direction in which the weight of the power unit of the vehicle acts on the engine mount when installed on the vehicle.

This above arrangement therefore effectively reduces the amount of displacement of the rubber block 28 or the amount of displacement of the first metal support 10 toward the second metal support 12, which takes place due to the weight of the power unit upon mounting of the power unit on the vehicle body via the instant engine mount. Consequently, the pressure increase in the pressure-receiving chamber 44 due to the weight of the power unit can be reduced. Therefore, the amount of volumetric increase of the equilibrium chamber 46 and the amount of displacement of the flexible diaphragm 36 can be accordingly reduced. Thus, the durability of the diaphragm 36 and that of the engine mount as a whole are improved over the conventional engine mount which does not use a stopper member.

Further, the reduction in the amount of displacement of the diaphragm 36 by the weight of the power unit results in an increase in the amount of volumetric change of the equilibrium chamber 46 during service of the engine mount installed in position. That is, the diaphragm 36 may be displaced by a sufficient amount permitting the fluid to flow into the equilibrium chamber 46, by an amount sufficient to effectively absorb or accommodate a large magnitude of input vibrations. Thus, the present engine mount is capable of exhibiting desired vibration damping and isolating characteristics, with improved reliability and consistency, even though the structure is compact and small-sized.

The stopper member 74 whose stop portion 76 is held in pressed contact with the first abutting surface 15 and is abuttable on the second abutting surface 18, also functions to protect the rubber block 28 against excessive amounts of elastic deformation or strain in the axial and radial directions, when the engine mount is subject to an extremely large amplitude of vibrations. Thus, the durability of the rubber block 28 is also improved. Furthermore, the amount of rebounding displacement of the power unit in the axial direction of the engine mount can be easily adjusted over a wide range, by adjusting the force by which the stop portion 76 of the stopper member 74 is pressed against the end face 15 of the base portion 14 of the first metal support 10.

Moreover, the stopper member 74 which covers the outer surface of the rubber block 28 serves to restrict the shape of the rubber block 28 when elastically deformed by the input vibrations. This contributes to avoiding an undesirable mode of change in the fluid pressure in the pressure-receiving chamber 44.

While the present invention has been described in its presently preferred form, for illustrative purpose only, it is to be understood that the invention is not limited to the details of the above embodiment.

Figure 4:
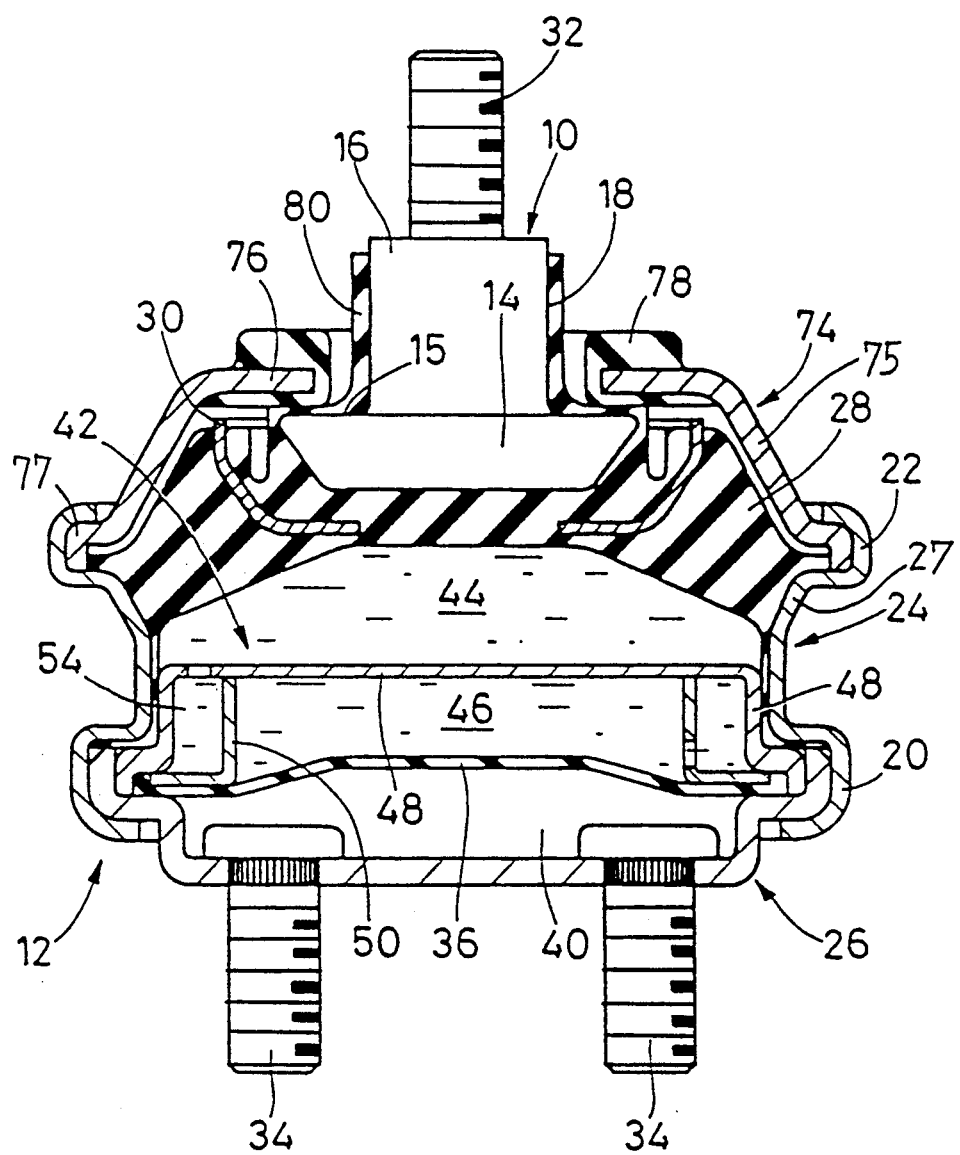
FIGS. 4 and 5 are elevational cross sectional views showing modified embodiments of the elastic mount of the invention.
Figure 5:
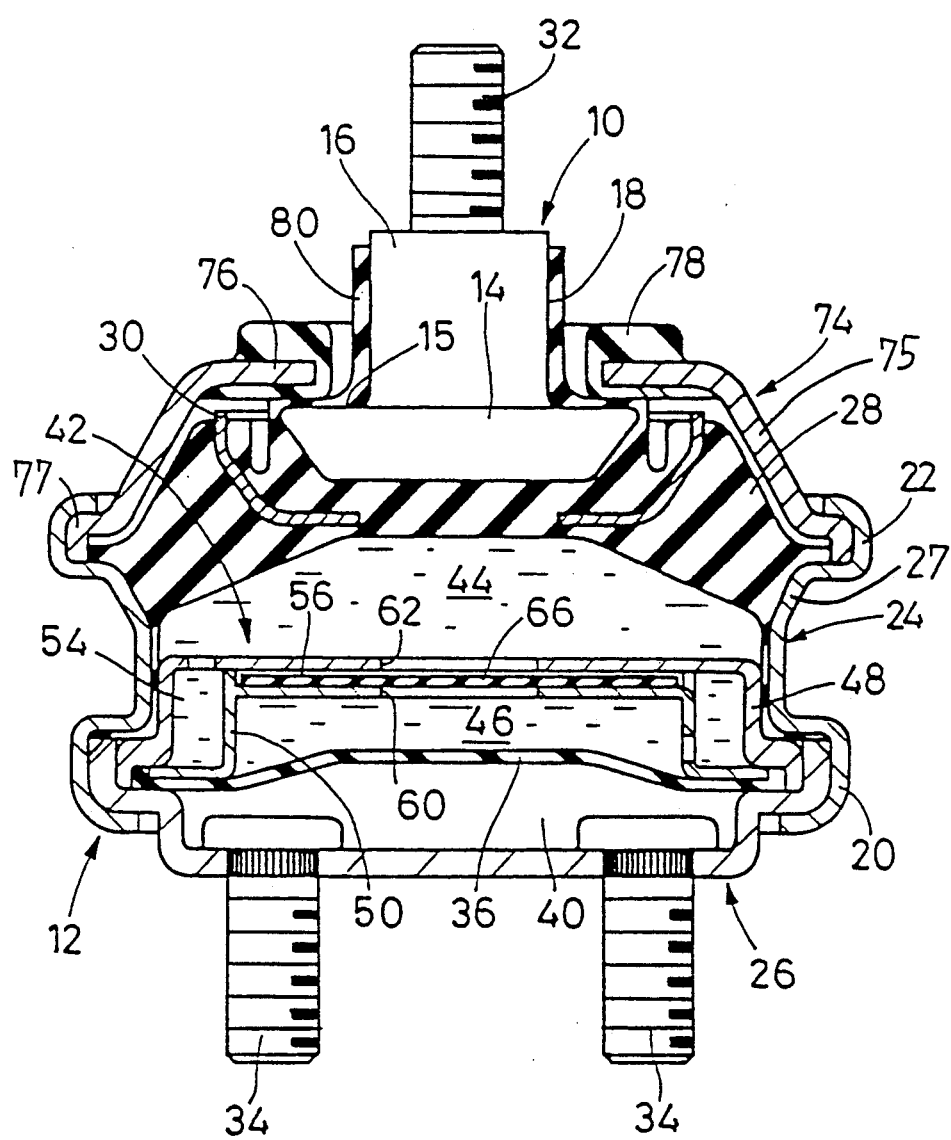

For instance, the partition assembly 42 which incorporates means for fluid communication between the pressure-receiving and equilibrium chambers 44, 46 may be modified as needed. Examples of modification of the partition assembly 42 are shown in FIGS. 4 and 5. In the modified arrangement of FIG. 4, the partition assembly 42 provides only the first orifice passage 54. The modified partition assembly 42 shown in FIG. 5 has only the first and second partition members 48, 50 which define the first orifice passage 54 and which carry only the first movable member 66. For easy understanding, the same reference numerals as used in FIG. 1 are used in FIGS. 4 and 5, to identify the functionally corresponding elements.

While the stopper member 74 in the illustrated embodiment is pressed against the first metal support 10 by means of calking of the generally cylindrical member 24 against the stopper member 74, the stopper member 74 may be pressed-worked for being pressed against the first metal support 10. In this case, it is possible to form the stopper member as an integral part of the second metal support 12.

It is also possible that the stopper member 74 is secured to the first metal support 10 while the abutting surfaces for the stopper member are provided on a flange which radially outwardly extends from the second metal support 12.

Although the first and second abutting surfaces 15, 18 in the illustrated embodiment are circumferential and annular surfaces, the abutting surfaces need not be continuous in the circumferential direction of the first or second metal support 10, 12.

While the illustrated engine mount is filled with the non-compressible fluid while the intermediate product of FIG. 2 and the dished member 26 are assembled together within a mass of the fluid, the fluid may be injected into the interior space of the engine mount through a suitable injection hole formed through the second metal support 12, after the rubber block 28 has been pre-compressed by the stopper member 74.

It will be understood that the present invention may be embodied with various other changes, modifications and improvements, which may occur to those skilled in the art, without departing from the spirit and scope of the invention defined in the following claims.

What is claimed is:

1. A fluid filled elastic mount for flexible connection of two members, comprising:

first support means and second support means which are disposed opposite to each other and spaced apart from each other in a load-receiving direction in which a major vibrational load is applied to the elastic mount.

an elastic body interposed between said first and second support means, for elastic connection of said first and second support means;

a closure member secured to said second support means and cooperating with at least said elastic body to define a fluid chamber filled with a non-compressible fluid, said closure member including a flexible portion;

partition means for dividing said fluid chamber into a pressure-receiving chamber formed on the side of said first support means, and an equilibrium chamber formed on the side of said second support means;

means for defining a restricted passage for restricted fluid communication between said pressure-receiving equilibrium chambers;

one of said first and second support means having a first abutting surface which extends substantially perpendicularly to said load-receiving direction, and a second abutting surface which is substantially perpendicular to said first abutting surface;

a stopper member secured to the other of said first and second support means, and including a stop portion which is spaced apart a predetermined distance from said second abutting surface in a direction perpendicular to said load-receiving direction; and means for holding said stop portion in pressed abutting contact with said first abutting surface in said load-receiving direction so that the first and second support means approach each other, whereby the entire length of said elastic body located between the first and second support means is precompressed in said load receiving direction, wherein the precompression of said elastic body does not cause an increase in fluid pressure of said fluid chamber, whereby said precompression of the elastic body causes no deflection of the flexible portion of said closure member.

2. A fluid-filled elastic mount according to claim 1, wherein said stopper member has a circular cross sectional shape as viewed in a plane perpendicular to said load-receiving direction, and includes a first axial end portion extending radially inwardly so as to provide said stop portion, and a second end portion at which said stopper member is secured to said other of the first and second support means.

3. A fluid-filled elastic mount according to claim 2, wherein said second end portion of said stopper member is secured to said other of said first and second support means by calking one of said second end portion and an end portion of said other of the first and second support means.

4. A fluid-filled elastic mount according to claim 1, wherein said stopper member is secured to said second support means.

5. A fluid-filled elastic mount according to claim 1, wherein said second support means comprises a dished member, and a generally cylindrical member secured at one end thereof to said dished member, said stopper member being secured to the other end of said generally cylindrical member.

6. A fluid-filled elastic mount according to claim 5, wherein said elastic body is secured to said first support means and said generally cylindrical member of said second support means.

7. A fluid-filled elastic mount according to claim 1, further comprising a stop rubber member in which said stop portion is embedded so that said stop portion is held in pressed contact with said first abutting surface via said stop rubber member, and is abuttable on said second abutting surface via said stop rubber member.

8. A fluid-filled elastic mount according to claim 1, wherein said partition means comprises said means for defining a restricted passage for restricted fluid communication between said pressure-receiving and equilibrium chamber.

9. A fluid-filled elastic mount according to claim 8, wherein said partition means comprises a first and a second partition member which cooperate with each other to provide said means for defining said restricted passage.

10. A fluid-filled elastic mount according to claim 1, wherein said partition means comprises a first and a second partition member which cooperate with each other to define a space therebetween, and a movable member received within said space, said first and second partition means having a first and a second hole through which said space communicates with said pressure-receiving and equilibrium chambers, said movable member being displaceable in said space in said load-receiving direction.

11. A fluid-filled elastic mount according to claim 10, wherein said partition means further comprises a third partition member which cooperates with said second partition member to define another space therebetween, and another movable member received in said another space, said another space communicating with said equilibrium chamber, and said space defined between said first and second partition members, said another movable member being displaceable within said another space in said load-receiving direction.

12. A process for producing a fluid-filled elastic mount for providing a flexible connection between two members comprising the steps of:

preparing an intermediate product by vulcanizing an elastic body between a first support means and a second support means which are opposite to each other and spaced apart from each other in a load-receiving direction in which a major vibrational load is to be applied to the elastic mount, said elastic body elastically connecting said first and second support means;

securing a stopper member to one of said first and second support means, said stopper member including a stop portion which is spaced apart a predetermined distance from the other of said first and second support means in a direction perpendicular to said load-receiving direction;

holding said stop portion in pressed abutting contact with said other of said first and second support means in said load-receiving direction so that the first and second support means approach each other, whereby the entire length of said elastic body located between the first and second support means is precompressed in said load-receiving direction;

providing a partition means, and a means for defining a restricted passage adjacent to said elastic body; and securing a closure member to said second support means so that said closure member cooperates with at least the precompressed elastic body to define a fluid chamber filled with a non-compressible fluid, said closure member including a flexible portion, said partition means dividing said fluid chamber into a pressure receiving chamber formed on the side of said first support means, and an equilibrium chamber formed on the side of said second support means, said restricted passage providing restricted fluid communication between said pressurereceiving chamber and said equilibrium chamber, wherein the precompression of said elastic body does not cause an increase in fluid pressure of said fluid chamber and causes no deflection of the flexible portion of said closure member.

13. The process according to claim 12, further comprising:

providing said other of said first and second support means with a first abutting surface which extends substantially perpendicularly to said load-receiving direction, and a second abutting surface which is substantially perpendicular to said first abutting surface, said stop portion of said stopper member being spaced apart from said second abutting surface and held in pressed abutting contact with said first abutting surface.

* * * * *